UNITED STATES PATENT OFFICE.

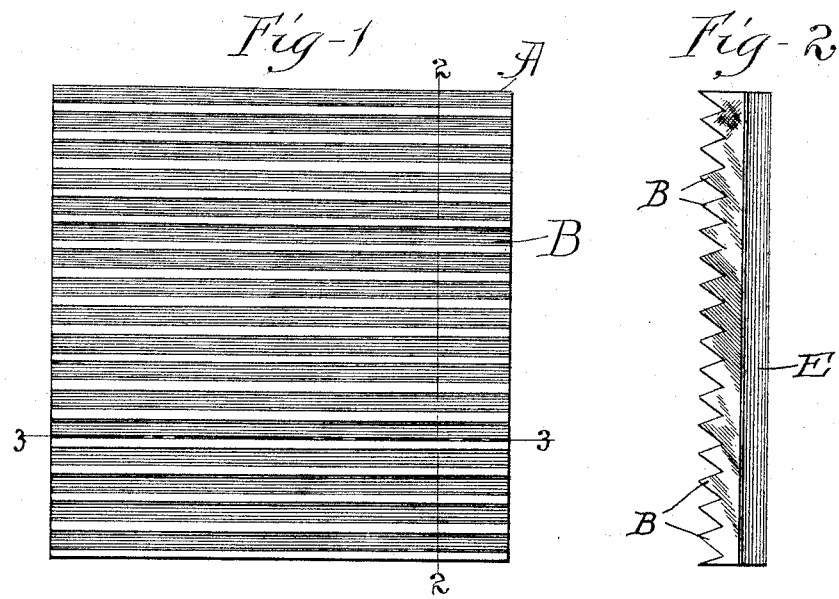
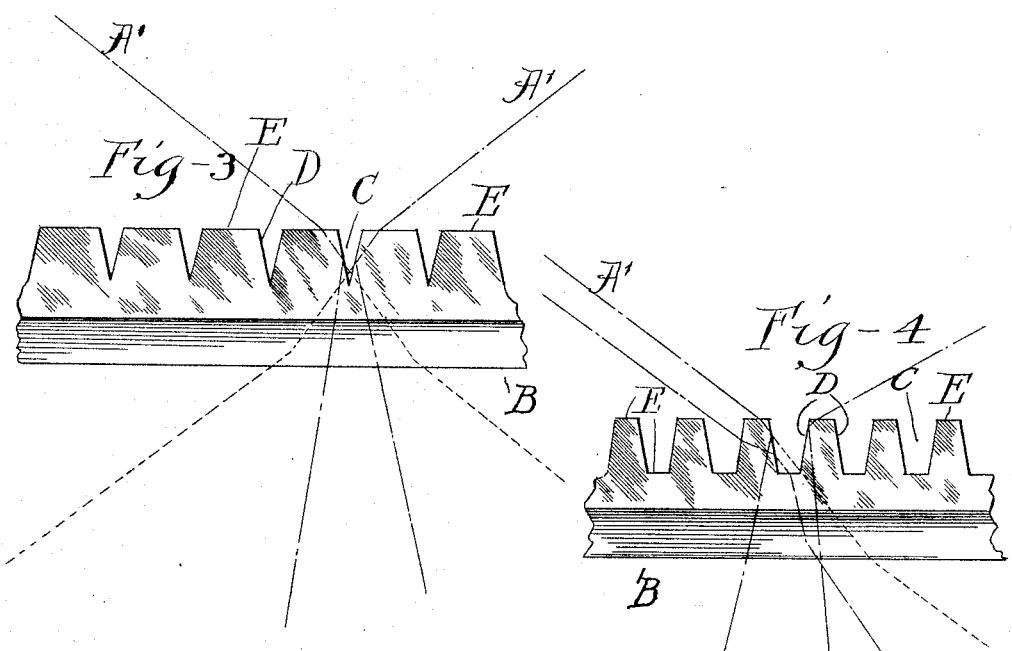

FRANK C. SOPER, OF CHICAGO, ILLINOIS, ASSIGNOR TO THE LUXFER PRISM PATENTS COMPANY, OF SAME PLACE.

WINDOW-LIGHT.

SPECIFICATION forming part of Letters Patent No. 586,249, dated July 13, 1897.

Application filed March 8, 1897. Serial No. 626,422. (No model.)

*To all whom it may concern:*

Be it known that I, FRANK C. SOPER, a citizen of the United States, residing at Chicago, in the county of Cook and State of Illinois, have invented certain new and useful Improvements in Window-Lights, of which the following is a description.

My invention relates to window-lights and the like, and has for its object to provide a new and improved window-light, of which the following is a description, reference being had to the accompanying drawings, wherein—

Figure 1 is a face view of the section of window-glass embodying my invention, looking toward the prism side. Fig. 2 is a section on line 2 2 of Fig. 1. Fig. 3 is a section on line 3 3 of Fig. 1. Fig. 4 is a section through a modified form of window-light.

Like letters refer to like parts throughout the several figures.

In the use of ordinary prismatic glass having horizontal ribs or prisms upon one side the light from the sky which comes in vertical planes perpendicular to the plane of the window is changed in direction and is projected toward the rear of the room in connection with which the glass is used. The oblique rays of light which strike such prismatic glass which are in planes not perpendicular to the plane of the window are practically lost, as they are not changed in direction, so as to be projected toward the rear of the room. It is the object of my present invention to provide a window-glass by which these oblique rays of light may be utilized.

In carrying out my invention I may take an ordinary section or plate A of prismatic glass provided on one side with the ordinary prisms or projecting ribs B. The other side of the glass is provided with a series of grooves C at an angle to the prisms or projecting ribs B. These grooves are provided with the faces D D, placed nearly perpendicular to the plane or receiving surfaces. The oblique rays of light A', striking the outer face of the glass, would be refracted and would take the direction shown in dotted lines, thereby being projected against the side of the wall in proximity to the window without being utilized in lighting the rear of the room. When the glass is provided with the grooves C, these rays of light A', striking the surface D, are reflected, as shown in full lines, their direction being so changed that when acted upon by the prisms B they are projected toward the rear of the room and are utilized in lighting the same. It will therefore be seen that in forming the window-glass with these grooves much more light can be utilized than when the ordinary prismatic glass is used, and hence a better illumination can be obtained in any given case.

In Fig. 4 I have shown the glass provided with grooves C which are larger than those shown in Fig. 3. In this construction the plane surface E of the glass is partly at the bottom of the grooves and partly at their outer ends, while in Fig. 3 the plane surface of the glass is all at the outer ends of the grooves. By this construction it will be seen that I greatly increase the general effect produced in illuminating any given room.

Broadly speaking, this invention consists of a prism-light comprising a body of glass with the usual substantially horizontal prisms on one side and on the other side a series of substantially vertical grooves having surfaces slightly inclined to the plane of that side and also arranged so as to leave wide or large plane surfaces on that side of the prism-light. The plate made up of these lights is called a "prism-plate."

By the words "extended plane surfaces" I mean any and all of the plane surfaces on the receiving side which are substantially parallel to the body of the window-light.

I claim—

1. As a new article of manufacture, a prism-light comprising a glass body substantially flat and having on the receiving side extended plane surfaces and on the other side a series of prisms systematically arranged to produce an increased illuminating effect in the apartment, the receiving side being broken by a series of faces nearly perpendicular to the plane surfaces.

2. As a new article of manufacture, a prism-light comprising a glass body substantially flat, having on the receiving side extended plane surfaces and on the other side a series of prisms systematically arranged to produce an increased illuminating effect in the apartment, the receiving-surface being broken by a series of wide grooves whose sides are nearly perpendicular to the plane surfaces of such receiving side.

3. As a new article of manufacture, a prism-light comprising a glass body substantially flat and having on the receiving side extended plane surfaces and on the other side a series of prisms systematically arranged to produce an increased illuminating effect in the apartment, the receiving side being broken by a series of faces nearly perpendicular to the plane surfaces, such prisms and perpendicular faces running across the prism-light substantially at right angles to each other.

4. As a new article of manufacture, a prism-light comprising a glass body substantially flat, having on the receiving side extended plane surfaces and on the other side a series of prisms systematically arranged to produce an increased illuminating effect in the apartment, the receiving-surface being broken by a series of wide grooves whose sides are nearly perpendicular to the plane surfaces of such receiving side, such prisms and grooves running across the prism-light at substantially right angles to each other.

FRANK C. SOPER.

Witnesses:
DONALD M. CARTER,
LILLEY W. JOHNSTONE.